US008196300B2

(12) United States Patent
Imamura et al.

(10) Patent No.: US 8,196,300 B2
(45) Date of Patent: Jun. 12, 2012

(54) MANUFACTURING METHOD OF ELECTRIC CONTACT AND MANUFACTURING EQUIPMENT OF ELECTRIC CONTACT

(75) Inventors: Seiji Imamura, Kawasaki (JP); Shinji Tada, Hino (JP); Mamoru Akimoto, Saitama (JP); Yuuichi Yamamoto, Saitama (JP); Toshiya Shibayanagi, Osaka (JP)

(73) Assignee: Fuji Electric Fa Components & Systems, Ltd., Tokyo (JP)

( * ) Notice: Subject to any disclaimer, the term of this patent is extended or adjusted under 35 U.S.C. 154(b) by 0 days.

(21) Appl. No.: 12/866,727

(22) PCT Filed: Jan. 16, 2009

(86) PCT No.: PCT/JP2009/000142
§ 371 (c)(1), (2), (4) Date: Nov. 26, 2010

(87) PCT Pub. No.: WO2009/098836
PCT Pub. Date: Aug. 13, 2009

(65) Prior Publication Data
US 2011/0099808 A1 May 5, 2011

(30) Foreign Application Priority Data
Feb. 8, 2008 (JP) ................................ 2008-028597

(51) Int. Cl.
*H01R 43/02* (2006.01)
*B23P 19/00* (2006.01)

(52) U.S. Cl. ................ 29/879; 29/747; 29/876; 29/877; 29/878; 228/112.1

(58) Field of Classification Search .................... 29/876, 29/877, 878, 747, 879; 228/112.1, 121.1
See application file for complete search history.

(56) References Cited

U.S. PATENT DOCUMENTS 4,139,140 A * 2/1979 Stockel ...................... 228/110.1
4,489,238 A * 12/1984 Baker ........................ 250/338.3
4,625,401 A * 12/1986 Cvijanovich .................... 29/885
4,910,868 A * 3/1990 Fevrier et al. .................. 29/879
7,370,784 B2 * 5/2008 Nagao ........................ 228/112.1
(Continued)

FOREIGN PATENT DOCUMENTS

JP S55-006746 A 1/1980
(Continued)

OTHER PUBLICATIONS

Katsuyuki Yoshikawa, 'Micro Spot Friction Welding', 11th Symposium MATE 2005, Japan Welding Society, 2005, pp. 421-424.
(Continued)

*Primary Examiner* — Carl Arbes
(74) *Attorney, Agent, or Firm* — Rabin & Berdo, P.C.

(57) ABSTRACT

A manufacturing method of an electric contact and manufacturing equipment of the electric contact. A contact and a metal base are superimposed and support by a jig, and a rotational tool, which rotates at a predetermined speed and advances/retracts to/from the jig, is pressed into a surface, which is not contacted with the contact, of the metal base while being rotated, so that the contact and the metal base are joined by solid state diffusion welding by using frictional heat generated by friction between the rotational tool and the metal base, and then the rotational tool is retracted from the metal base.

20 Claims, 9 Drawing Sheets

10 24 16 29 18 14 35 33 31 20 22 1 3 27 25 26 50 12

U.S. PATENT DOCUMENTS 7,455,210 B2 * 11/2008 Nagao et al. .................. 228/2.1
7,641,096 B2 * 1/2010 Burton et al. ............. 228/112.1
7,703,659 B2 * 4/2010 Kashiki et al. ............ 228/112.1
2004/0112939 A1 * 6/2004 Nagao et al. ................. 228/102

FOREIGN PATENT DOCUMENTS

JP S57-101310 A 6/1982
JP S58-186115 A 10/1983
JP S60-250891 A 12/1985
JP S61-017394 A 1/1986
JP H6-047570 A 2/1994
JP H10-269883 A 10/1998
JP 2001-090655 A 4/2001
JP 2002-059274 A 2/2002
JP 2003-311440 A 11/2003
JP 2005-103615 A 4/2005
JP 2006-021217 A 1/2006
JP 2006-102748 A 4/2006
JP 2007-319931 A 12/2007
WO WO-2005-092558 A1 10/2005

OTHER PUBLICATIONS

Kinya Aota 'Spot Friction Stir Welding of Al/Cu', Whole Country Meeting of Japan Welding Society Lecture Abstract, Sep. 2004.

* cited by examiner

MANUFACTURING METHOD OF ELECTRIC CONTACT AND MANUFACTURING EQUIPMENT OF ELECTRIC CONTACT

This application is the national phase of international application number PCT/JP2009/000142, filed Jan. 16, 2009, and claims the benefit of priority of Japanese application 2008-028597, filed Feb. 8, 2008. The disclosures of the international application and the Japanese priority applications are incorporated herein by reference.

BACKGROUND OF THE INVENTION

1. Field of the Invention

The present invention relates to a manufacturing method of an electric contact used for an electromagnetic switch, an electromagnetic contactor, a circuit breaker and the like, and relates to a manufacturing equipment of the electric contact.

2. Description of the Related Art

For example, an electric contact for an electromagnetic switch, an electromagnetic contactor and the like are configured such that a movable-side contact and a fixed-side contact are contacted and separated to/from each other so as to switch an electric circuit, thereby ON/OFF operation of electrical connection is performed. The contacts are connected to a movable-side metal base and a fixed-side metal base, each metal base having a predetermined shape, and supported thereby respectively.

As a method of joining a metal base and a contact together, a mechanical joining method and a welding method have been used in the past. The mechanical joining method includes caulking, cladding and the like. However, the mechanical joining method tends to be limitedly used for a joint having a small current capacity. Therefore, as a joint has a larger current capacity, a method using welding is increasingly needed, whereby joining area between a contact and a metal base can be adequately secured. The method using welding includes ultrasonic welding, resistance heating brazing, resistance spot brazing, resistance spot welding, furnace brazing, and high frequency induction brazing.

In welding, in the case of joining a relatively small contact (for example, a contact having area of width of 4.6 mm*height of 4.6 mm), a method using ultrasonic welding, and a method using resistance brazing or resistance spot brazing are generally used. In the case of welding, as a material of a contact, a Cd-based material typified by AgCdO/AgCd-based material, AgCdO/Ag-based material and the like, or a Cd-free material such as $AgSnO_2$—$In_2SnO_2$/Ag-based material is used. In the light of mass productivity, ultrasonic welding is often used for the former, Cd-based material.

Recently, from the environmental consideration, a Cd-free contact containing no Cd is increasingly used, and the Cd-free material such as $AgSnO_2$—$In_2SnO_2$/Ag-based material is now largely used. However, when such a Cd-free material is used for a small contact, and subjected to ultrasonic welding, a problem of fluctuation in joining strength occurs as compared with a contact using a Cd-based material. Moreover, in the case of the ultrasonic welding, joint quality between a contact and a metal base has been varied in some combination of a contact material and a metal base material, causing fluctuation in joining strength. When such fluctuation occurs in joining strength between the contact and the metal base, electric switching life of the contact may be affected. Consequently, the ultrasonic welding has been hardly used for mass production in some case.

Thus, the resistance brazing or the resistance spot brazing, which hardly affects joint quality, is used in some combination of a contact material and a metal base material. However, in this case, brazing filler metal needs to be used, causing a problem of increase in material cost, or increase in manufacturing cost due to a fact that a step needs to be added for inserting a brazing filler metal foil between a contact and a metal base. Furthermore, since the materials are heated to at least a melting temperature of brazing filler metal, the metal base is softened, causing a problem that the metal base must be subjected to some sort of treatment.

On the other hand, a joining technique called friction stir welding is now gradually used as a joining method for joining metal members to each other. In this technique, while a tool having a pin protrusively provided on an end face of the tool is rotated, the tool is pressed into a joint between members to be joined so as to generate frictional heat in the joint by rotation of the pin, so that the joint is stirred while being softened, causing plastic flow, and consequently the members are joined to each other via the plastic flow.

Katsuyuki Yoshikawa, 'Micro Spot Friction Welding', 11th Symposium MATE 2005, Japan Welding Society, 2005, pp. 421-424 (Non-Patent Document 1) discloses that, as a general principle of the friction stir welding, a tool is pressed into two sheets being superimposed while being rotated, and thereby the two sheets are joined by friction stir welding by using plastic deformation of a sheet material and frictional heat (that is, by using plastic flow). It is described that the plastic flow ranges over both the superimposed sheets, leading to welding of the two sheets.

JP-A-2006-21217 (Patent Document 1) discloses a friction stir welding apparatus for spot welding, which immerses a rotating joining tool into an object to be joined including a plurality of members to be joined for spot-welding the members to be joined to each other, includes a tool holding section that has a predetermined rotational axis, and holds the joining tool coaxially with the rotational axis; a rotational drive unit that drives to rotate the tool holding section around the rotational axis; a linear drive unit that drives the tool holding section to shift along the rotational axis; a base that supports the tool holding section; a laser beam generation unit for irradiating a condensed laser beam; and a control unit that controls the rotational drive unit, linear drive unit, and laser beam generation unit such that the laser beam is irradiated onto a portion to be joined formed on the object to be joined before the joining tool is immersed into the portion to be joined, so that the portion to be joined is heated to the softening temperature being lower than a melting point of the object to be joined, and high enough to soften the portion to be joined relatively to the joining tool.

Kinya AOTA 'Spot Friction Stir Welding of Al/Cu' (Whole Country Meeting of Japan Welding Society Lecture Abstract, September 2004) (Non-Patent Document 2), relating to a joining between an aluminum plate and a copper plate, mentions on the interfacial characteristics of the joining when a joining tool is pressed on top of a portion where the aluminum plate and the copper plate are overlapped. It, however, doesn't mention on the controlling of the depth of the pressing.

JP-A-S60-250891 (Patent Document 2) discloses a manufacturing method of an electric contact, which includes: forming a series of grooves having a certain pitch on a surface of a metal base; laying a piece of contact on the series of grooves; grasping while adding pressure the metal base and the piece of contact between a horn and an anvil with which an ultrasonic welding machine is equipped; and ultrasonic stirring a horn head in a direction aliened along the grooves, such that the piece of contact and the metal base can join each other.

JP-A-S55-006746 (Patent Document 3) discloses a manufacturing method of an electric contact, which includes: grasping while adding pressure a metal base and a contact between two electrodes; heating by allowing to pass electric current between the electrodes; and quick-chilling after the heating, such that the metal base and the contact can join each other.

JP-A-H10-269883 (Patent Document 4) discloses a manufacturing method of a contact member, which includes: forming in a metal base a crevice smaller than an outer diameter of a contact, the contact being made of a meltable material; laying the contact on the crevice, and welding and press-molding the contact laid on the crevice by use of a welding machine, such that the contact can be made to weld to the metal base in a predetermined shape.

JP-A-S58-186115 (Patent Document 5) discloses a manufacturing method of a silver/oxide type electric contact, which includes: inserting two of contact members between resistive electrodes by use of a resistance welding machine; pouring at least enough amount of an organic solvent to replace air in said inserted contact members; and adding pressure and allowing to pass electric current to thereby make a complex contact constituted by the two of contact members.

JP-A-S61-017394 (Patent Document 6) discloses a manufacturing method of a contact material, which includes: overlaying a first layer, the first layer consisting of a first component to constitute the contact material, to weld with a second layer, the second layer consisting of at least a second component, and being arranged to be in a thickness so as to become a predetermined composition of alloy when melting.

In the case of the above two types of friction stir welding, members are joined to each other by using plastic flow induced by friction stir of the members caused by rotation of the tool. However, since the tool needs to be pressed somewhat deep in order to join the two members together by using plastic flow, time required for joining has been increased, causing a problem in productivity. In addition, a dent or an impression caused by the tool has been sometimes conspicuous, causing a problem in quality.

Therefore, an object of the invention is to provide a manufacturing method of an electric contact, in which time required for joining together a contact and a metal base is short, and a dent or an impression can be suppressed to be formed on the contact, and provide manufacturing equipment of the electric contact.

SUMMARY OF THE INVENTION

To achieve the object, a manufacturing method of an electric contact of the invention is carried out according to the following procedure. First, a contact and a metal base are superimposed and supported by a jig, and a rotational tool is pressed into the metal base at a predetermined speed while being rotated at a position corresponding to the contact on a surface of the metal base, the surface being not contacted with the contact. Then, the contact and the metal base are joined by solid state diffusion welding by using frictional heat generated by friction between the rotational tool and the metal base, and then the rotational tool is retracted from the metal base.

According to the invention, the rotational tool is pressed into the metal base while being rotated, and thereby the frictional heat caused by the rotational tool is transferred to contact surfaces of the metal base and the contact, so that solid state diffusion welding is performed between the contact surfaces. Then, the rotational tool is retracted from the metal base, and thereby joining between the metal base and the contact is completed.

That is, the manufacturing method is different from a method where members are joined to each other by using plastic flow as in the friction stir welding, in addition, different from a method where members to be joined are melted for diffusion welding. The manufacturing method is designed such that the metal base and the contact are joined by solid state diffusion welding by using frictional heat caused by the rotational tool and pressing pressure of the rotational tool. Therefore, time required for joining can be reduced, leading to improvement in productivity. Moreover, since pressing depth of the rotational tool can be decreased to the minimum necessary depth, dimension stability can be improved, and a dent, an impression, contact marks, discoloration and the like can be suppressed to appear on the contact. Furthermore, pressing depth of the rotational tool is controlled, and thereby an electric contact having substantially no fluctuation in quality can be stably produced.

In the friction stir welding, joining between the same metals (for example, each member including aluminum) has been mainly performed so far, and joining between different metals such as a contact including silver-based material and a metal base including copper alloy material, has not been achieved, therefore joint quality has been unclear in such joining between different metals. On the contrary, in the invention, since the contact and the metal base are joined by solid state diffusion welding, even if different metals, such as a contact including silver-based material and a metal base including copper alloy material, are to be joined to each other, the metals can be joined with good joint quality.

In the manufacturing method of an electric contact of the invention, preferably, pressure of the rotational tool or motor torque for rotating the rotational tool is detected, and a pressing position at which the pressure or the motor torque exceeds a predetermined value is assumed as an adhesion start point, then the rotational tool is further pressed from the adhesion start point to a predetermined depth position. According to this, since the pressing position, at which the pressure or the motor torque exceeds the predetermined value, is assumed as the adhesion start point, then the rotational tool is pressed from the point to the predetermined depth position, pressing depth of the rotational tool is easily grasped, and the metal base and the contact can be efficiently joined at the minimum necessary pressing depth.

In the manufacturing method of an electric contact of the invention, preferably, the rotational tool is further pressed from the adhesion start point to the predetermined depth position, and held at the position for a certain time, and then retracted from the metal base. According to this, the rotational tool is held for a certain time from a point at which the tool has reached the predetermined depth, thermal energy required for solid state diffusion welding between the joining surfaces can be securely transferred.

In the manufacturing method of an electric contact of the invention, the pressing depth of the rotational tool from the adhesion start point is preferably 1/20 or more of thickness of the metal base. According to this, the rotational tool is pressed to a depth position corresponding to 1/20 or more of thickness of the metal base, and thereby the metal base and the contact can be securely joined by solid state diffusion welding.

In the manufacturing method of an electric contact of the invention, a groove having a predetermined depth is preferably provided on a surface of the metal base, the surface being to be contacted with the contact. According to this, during solid state diffusion welding, a contact surface of the contact is plastically deformed and enters the groove of the metal base, and the contact is joined to the metal base in such a condition, therefore an anchor effect acts to resist force in a shear direction, so that shear strength can be improved.

In the manufacturing method of an electric contact of the invention, preferably, at least a contact surface, which is to be contacted with the contact, of the metal base may be subjected to plating including metal being feasible for mutual solid state diffusion with the contact. According to this, when the metal base is heated by frictional heat caused by the rotational tool, a plating layer on the metal base exhibits solid state diffusion so that the metal base can be easily joined with the contact.

In the manufacturing method of an electric contact of the invention, preferably, diameter of the rotational tool is 3 to 9 mm, the number of rotations of the rotational tool is 3000 to 10000 rpm, and thickness of the metal base is 1 to 2.5 mm. According to this, since frictional heat caused by the rotational tool is effectively transferred to contact surfaces of the metal base and the contact, solid state diffusion welding can be easily performed.

On the other hand, manufacturing equipment of an electric contact of the invention has the following components.

That is, the manufacturing equipment includes, a jig for superimposing and supporting a contact and a metal base, a rotational tool that rotates at a predetermined speed, and advances/retracts to/from the jig so as to be pressed into the metal base at a position corresponding to the contact on a surface of the metal base, the surface being not contacted with the contact, a detection unit of pressure of the rotational tool, or a detection unit of motor torque of the rotational tool, and a control unit that controls raising and lowering of the rotational tool based on a signal from the pressure detection unit or the motor torque detection unit.

The control unit is configured such that when the rotational tool is pressed into the metal base while being rotated, the control unit determines a position, at which the pressure or the motor torque detected by the pressure detection unit or the motor torque detection unit exceeds a predetermined value, as an adhesion start point, and drives the rotational tool so as to be further pressed from the adhesion start point to a predetermined depth position, and then retracted from the metal base.

According to the invention, the rotational tool can be pressed from the adhesion start point to the predetermined depth position, and then retracted from the metal base by the control unit. Therefore, heating required for solid state diffusion welding between contact surfaces of the contact and the metal base can be accurately and evenly performed in minimum necessary time. Therefore, qualities such as joining strength, dimension stability, and appearance can be made constant, and production efficiency can be improved.

In the manufacturing equipment of an electric contact of the invention, preferably, the control unit drives the rotational tool so as to be further pressed from the adhesion start point to a predetermined depth position, and held at the position for a certain time, and then retracted from the metal base. According to this, since the rotational tool is held for a certain time from a point at which the tool has reached the predetermined depth, thermal energy required for solid state diffusion welding between the joining surfaces can be securely transferred.

In the manufacturing equipment of an electric contact of the invention, the jig is preferably formed of ceramics or stainless steel. According to this, heat caused by friction between the rotational tool and the metal base is hardly transferred to the jig, and consequently the heat can be efficiently transferred to the contact surfaces of the metal base and the contact.

According to the invention, the rotational tool is pressed into the metal base while being rotated, and thereby the frictional heat caused by the rotational tool is transferred to the contact surfaces of the metal base and the contact, and thereby solid state diffusion welding is performed between the contact surfaces. Then, the rotational tool is retracted from the metal base, and thus joining between the metal base and the contact is completed. In this way, the metal base and the contact are joined by solid state diffusion welding by using frictional heat caused by the rotational tool and pressing by the rotational tool. Therefore, time required for joining can be reduced, leading to improvement in productivity. Moreover, pressing depth of the rotational tool is decreased to the minimum necessary depth, and thus a plastic flow area can be reduced. Therefore, dimension stability can be improved, and a dent, an impression, contact marks, discoloration and the like can be suppressed to appear on the contact.

BRIEF DESCRIPTION OF THE DRAWINGS

FIGS. 3A to 3B show a jig for supporting a metal base and a contact, wherein FIG. 3A shows a section view along an arrow line A-A of FIG. 3B, and FIG. 3B shows a plan view;

FIGS. 4A to 4B show another configuration of the jig, wherein FIG. 4A shows a side view, and FIG. 4B shows a plan view;

FIGS. 7A to 7C show a rough process of joining, wherein FIG. 7A shows a perspective view of a first step, FIG. 7B shows an explanatory view of a second step, and FIG. 7C shows an explanatory view of a third step;

FIGS. 8A to 8B show a relationship between a rotational tool and a contact, wherein FIG. 8A shows an explanatory view in the case that the contact is larger than the rotational tool, and FIG. 8B shows an explanatory view in the case that the rotational tool is larger than the contact; and FIGS. 9A to 9D show a condition where a groove is formed in a back of the metal base, wherein FIG. 9A shows a front view of the condition, FIG. 9B shows an explanatory view of a first mode, FIG. 9C shows an explanatory view of a second mode, and FIG. 9D shows an explanatory view of a third mode.

DESCRIPTION OF THE PREFERRED EMBODIMENTS

Figure 3A:
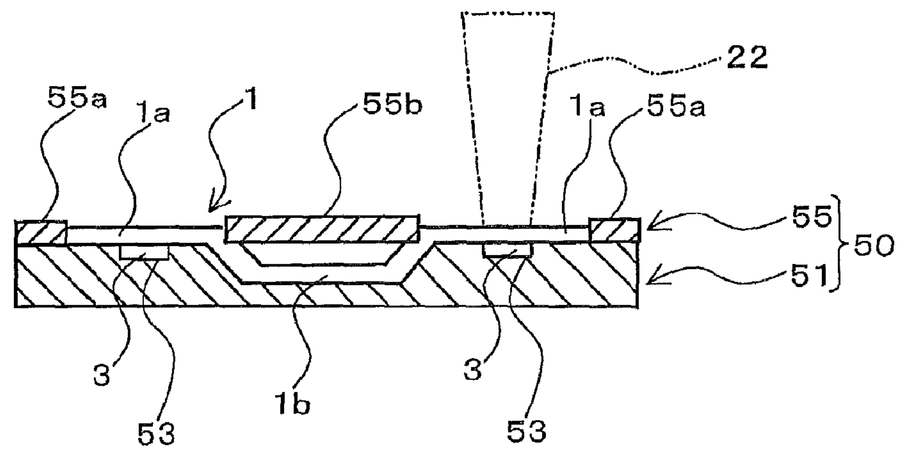
Figure 3B:
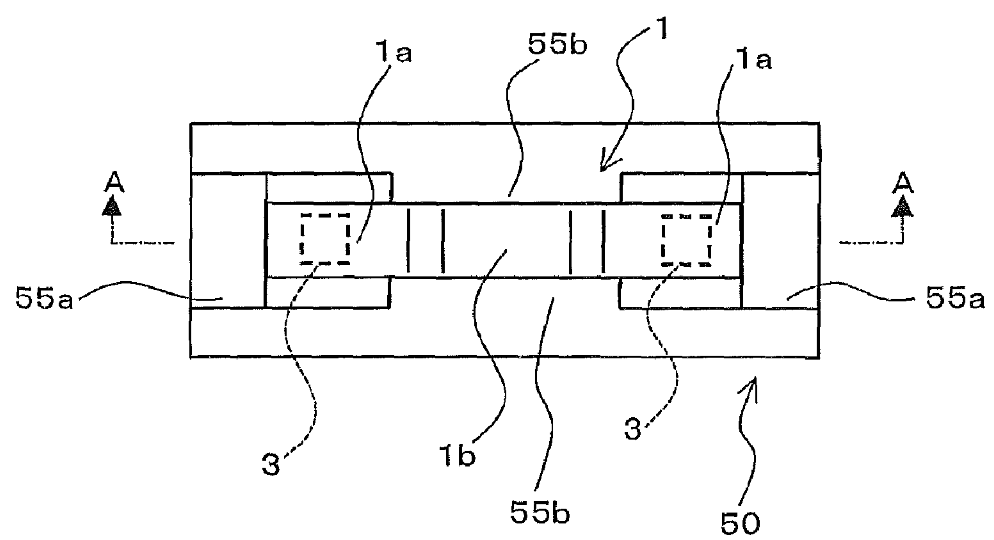

Hereinafter, a preferred embodiment of manufacturing equipment of an electric contact of the invention will be described with reference to drawings. The manufacturing equipment of an electric contact is intended to obtain an electric contact by joining a metal base 1 with a contact 3. As shown in FIGS. 3A and 3B, the metal base 1 in the embodiment extends in an approximately belt like manner with a certain length, and is in a configuration where both side portions 1*a* and 1*a* of the metal base are folded to the outside with respect to a middle portion 1*b*. Square contacts 3 and 3 are joined to bottoms of the side portions 1*a* and 1*a* of the metal base 1 respectively.

Figure 1:
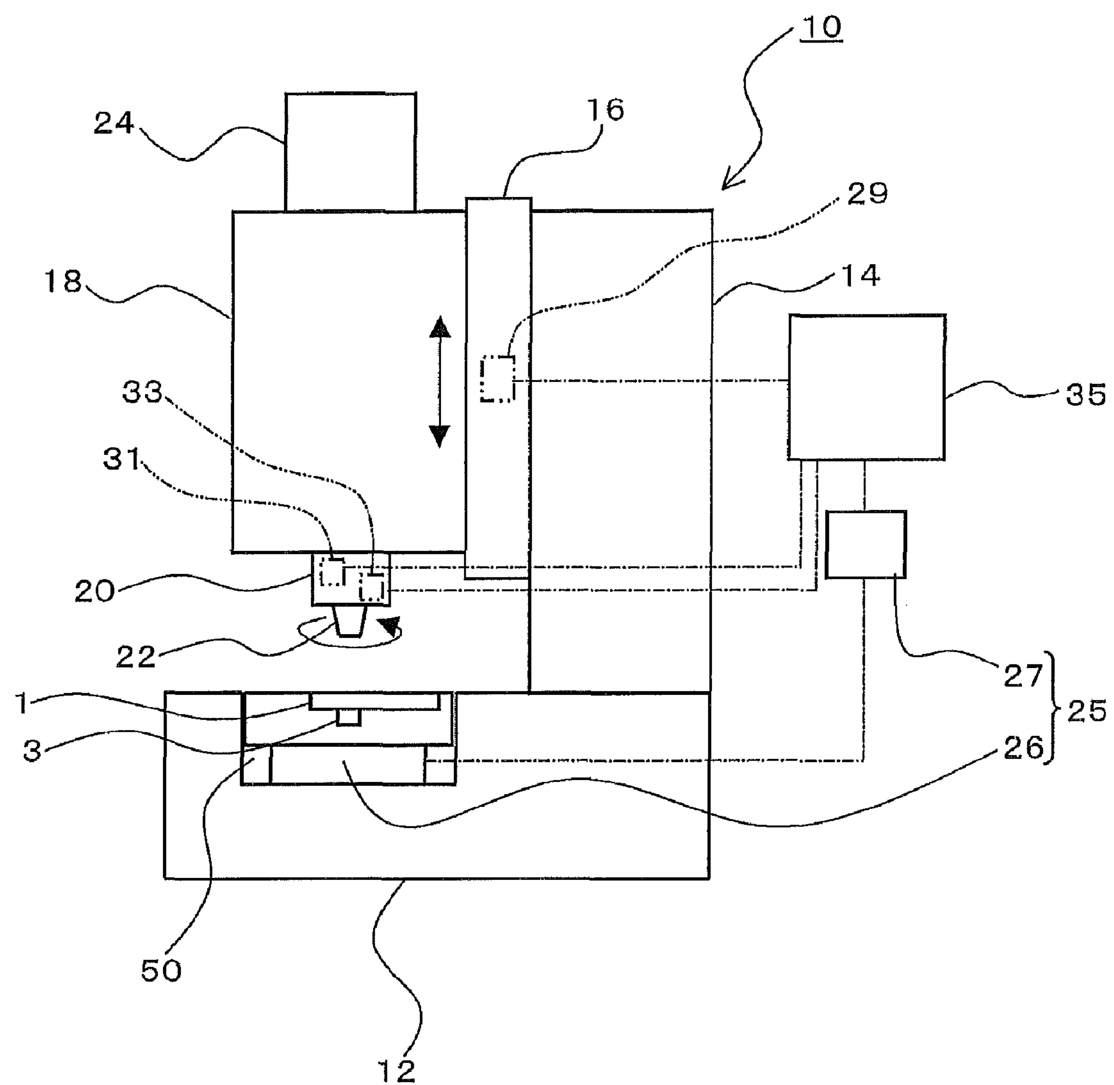
FIG. 1 shows a schematic block diagram showing an embodiment of manufacturing equipment of an electric contact of the invention.

FIG. 1 shows a schematic block diagram of manufacturing equipment 10 of an electric contact of the embodiment (hereinafter, called 'manufacturing equipment 10'). As shown in the figure, the manufacturing equipment 10 has a fixing plate 12 for fixing a jig 50 for superimposing and supporting the metal base 1 and the contact 3, a post 14 standing from the fixing plate 12, a tool support cylinder 18 supported in a raisable/lowerable manner by the post 14 via a raising/lowering unit 16, and a rotational tool 22 fixed to the lower side of the tool support cylinder 18 via a fixing chuck 20. A rotational unit 24 is disposed at an upper side of the tool support cylinder 18, and a rotational shaft of the rotational unit is connected to the rotational tool 22.

Therefore, the rotational tool 22 is configured to be raised and lowered in a forward and backward movable manner with respect to the jig 50 by the raising/lowering unit 16, and configured to rotate at a predetermined speed by the rotational unit 24. The rotational tool 22 has a cylindrical shape being gradually contracted in diameter toward an end thereof, and an end surface of the tool has a flat, circular shape. The rotational tool 22 rotates at a position corresponding to the contact 3 in a surface of the metal base 1, the surface being not contacted with the contact 3, and thereby the rotational tool 22 is pressed into the metal base 1 while generating frictional heat between a top of the metal base 1 and the end surface of the rotational tool 22.

Figure 6:
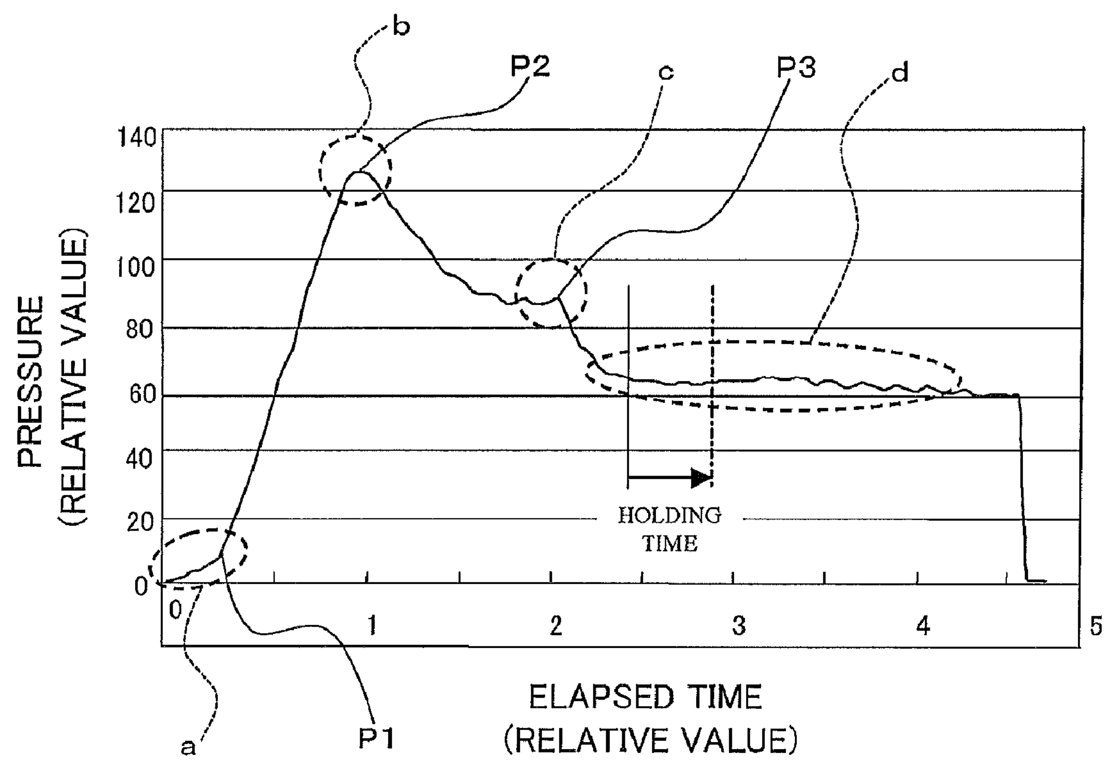
FIG. 6 shows a diagram showing a relationship between elapsed time and pressure during joining.

In the fixing plate 12, a pressure measurement sensor 26 is disposed at a position in alignment with the rotational tool 22. The pressure measurement sensor 26 is connected to a control unit 35 such as an NC controller via a pressure waveform detection controller 27. The pressure waveform detection controller 27 converts pressure of the rotational tool 22 detected by the pressure measurement sensor 26 into a waveform showing variation in pressure after a certain time has passed as shown in FIG. 6 (showing a correlation between time and pressure). The pressure measurement sensor and the pressure waveform detection controller 27 collectively form a pressure detection unit 25 of the invention. The control unit 35 is connected to a position calculating unit 29 disposed near the raising/lowering unit 16, and furthermore connected to a rotational speed detection unit 31 and a motor torque detection unit 33 disposed near the fixing chuck 20 respectively.

The pressure detection unit 25 detects pressure of the rotational tool 22 to the metal base 1, the rotational tool 22 being pressed to the metal base 1 by the raising/lowering unit 16. The position calculating unit 29 calculates a position of the rotational tool 22 vertically advancing and retracting by the raising/lowering unit 16, that is, calculates a distance of the tool 22 from the metal base 1 based on a drive signal from the raising/lowering unit 16. Furthermore, the rotational speed detection unit 31 and the motor torque detection unit 33 detect rotational speed and torque of the rotational tool 22 respectively.

Figure 2:
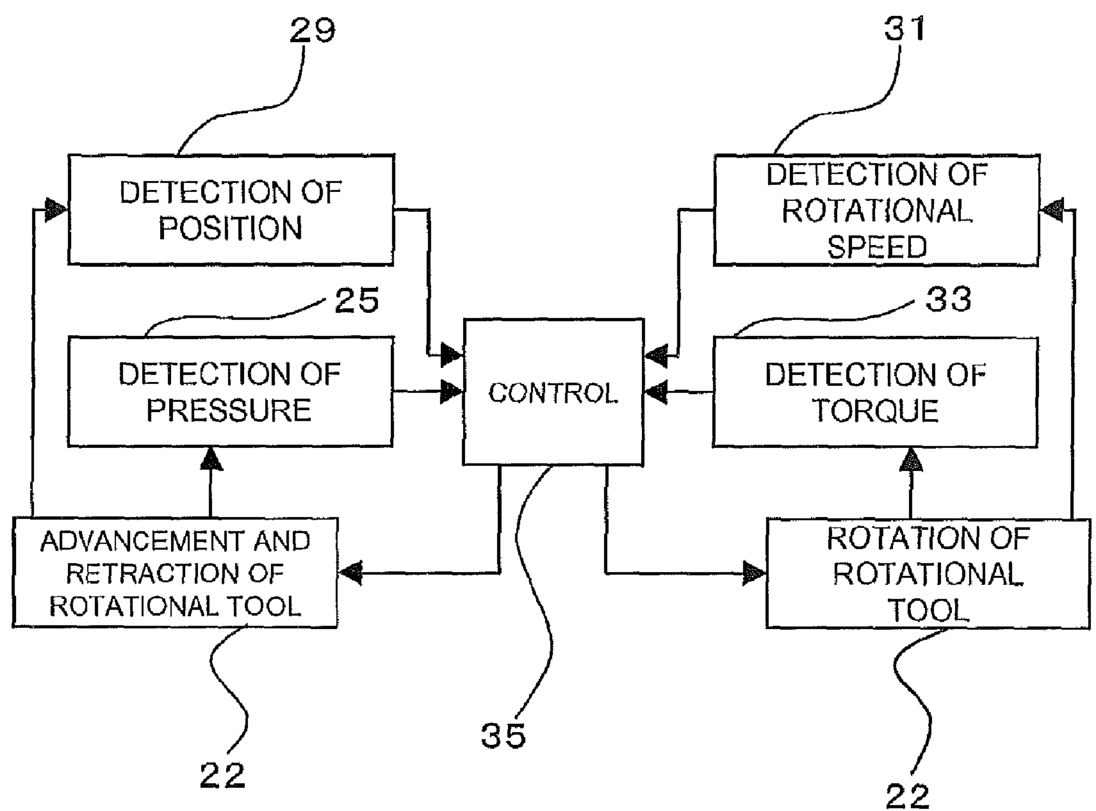
FIG. 2 shows a block diagram of a control unit of the manufacturing equipment.

As shown in FIG. 2, the control unit 35 controls the advancement and retraction of the rotational tool 22 based on a signal outputted from each of the pressure detection unit 25 and the position calculating unit 29, and controls rotation of the rotational tool 22 based on a signal outputted from each of the rotational speed detection unit 31 and the motor torque detection unit 33.

Next, description is made of the jig 50 for superimposing and supporting the metal base 1 and the contact 3. As shown in FIGS. 3A and 3B, the jig 50 has a base part 51 and a holding part 55 that is removably mounted on the base part 51, and holds the metal base 1 to the jig 50. The base part 51 has recesses 53 to be fitted with the contacts 3 respectively, and has atop shaped in accordance with the metal base 1. The holding part 55 has a pair of side holders 55*a*, 55*a* that contact to end faces of both side portions 1*a* and 1*a* of the metal base 1 respectively, and a pair of middle holders 55*b*, 55*b* that contact to both sides of middle portion 1*b* of the metal base 1 respectively.

Each of the contacts 3 is fitted into each of the recesses 53 of the base part 51, and the metal base 1 is superimposed thereon, and then the holding part 55 is mounted on the base part 51. Thus, the side holders 55*a* and the middle holders 55*b* contact to the side portions 1*a*, 1*a* of the metal base 1 and the middle portion 1*b* thereof respectively. As a result, the metal base 1 is held to be prevented from rising from the base part 51, so that the metal base 1 and the contact 3 are supported in a superimposed manner while being tightly contacted with each other. In this condition, the jig 50 is disposed on the pressure measurement sensor 26 of the manufacturing equipment 10, and fixed to the fixing plate 12 by a not-shown fixing unit. And, as shown an imaginary line in FIG. 3A, the end face of the rotational tool 22, which has a flat surface, is pressed into the metal base 1 at a position corresponding to the contact 3 in a surface of the metal base 1, which is not in contact with the contact 3. In FIG. 3A, a top surface of the metal base 1 does not come in contact with the contact 3, whereas a bottom surface of the metal base 1 comes in contact with the contact 3.

As material of the jig 50, for example, ceramics or stainless steel is preferably used. Since such material has high heat resistance and low heat conductivity, frictional heat caused by rotation of the end face of the rotational tool 22 on the metal base 1 is hardly transferred to the jig 50. As a result, the frictional heat can be efficiently transferred to the contact surfaces of the metal base 1 and the contact 3, and consequently joining between the metal base 1 and the contact 3, described later, can be quickly performed.

Figure 4A:
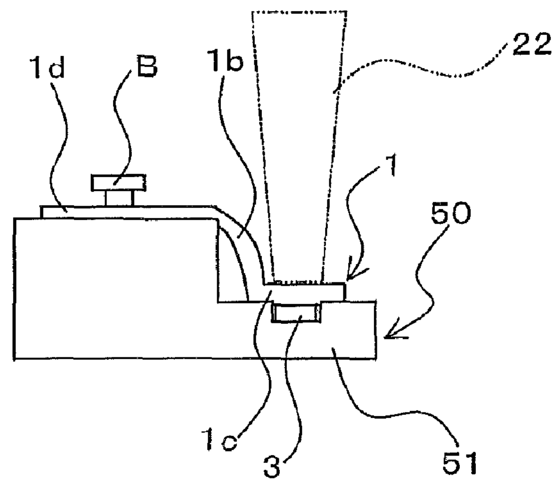
Figure 4B:
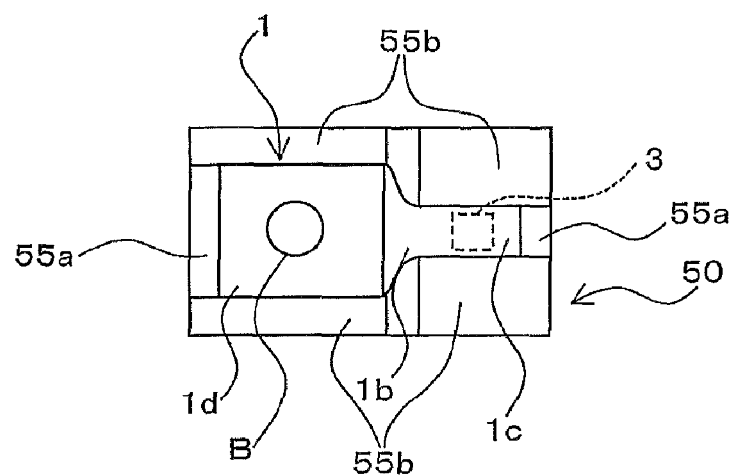

For the jig 50, not only a configuration as shown in FIGS. 3A to 3B, but also various configurations can be used depending on a shape of each of the contact 3 and the metal base 1. FIGS. 4A to 4B show an example of such configurations. In this case, the metal base 1 has a configuration where one side portion 1*c* to be joined with the contact 3 is connected with the other side portion 1*d* via a curved middle portion 1*b*. The side portion 1*d* may be formed to be wider than the side portion 1*c*. One side portion of the base part 51 is shaped to be raised in accordance with the metal base 1. The wider side portion 1*d* of the metal base 1 is set on the raised side portion of the base part 51, and fixed by fastening to the base part 51 by a bolt B.

Figure 5:
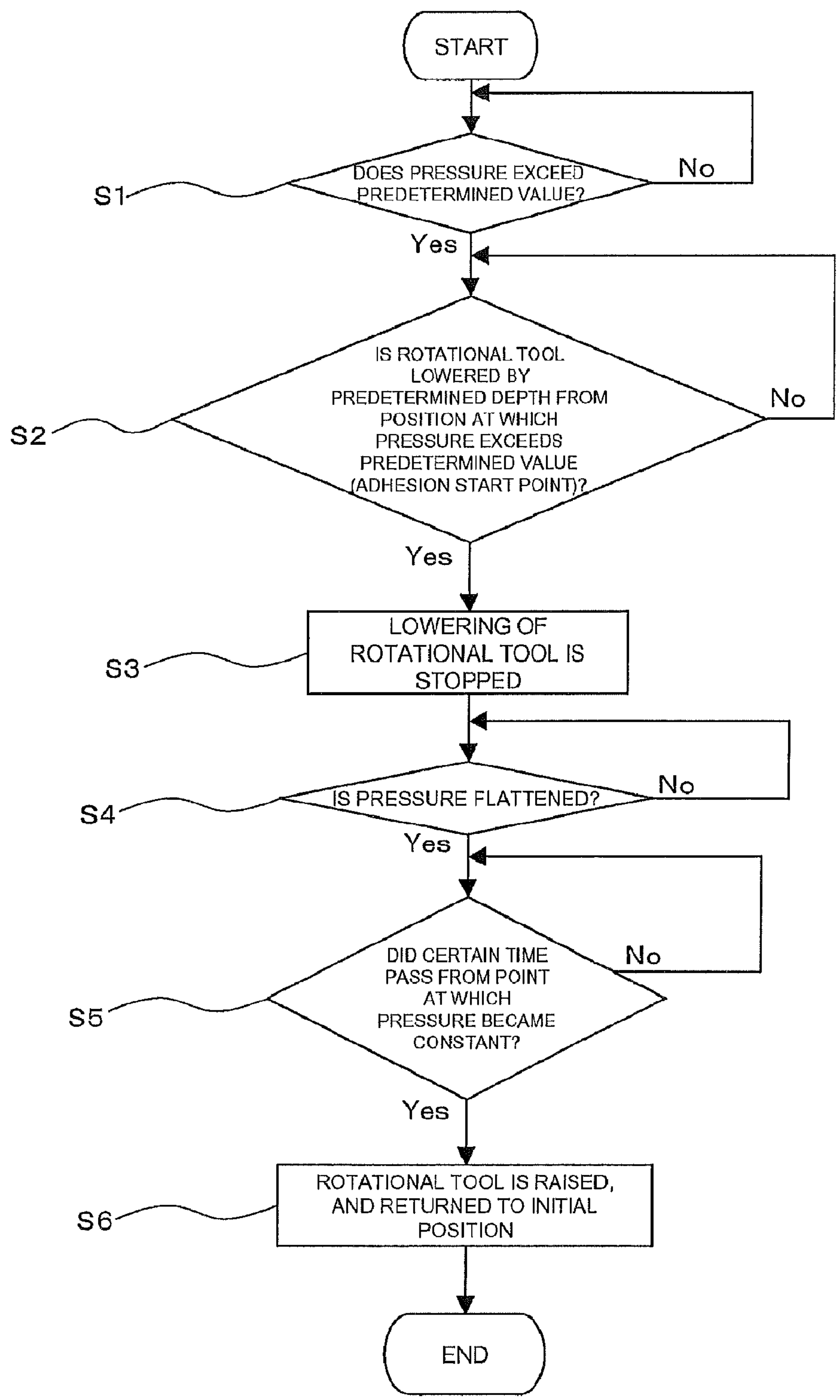
FIG. 5 shows a flowchart showing a joining process in the electric contact of the invention.

Next, a process of joining the contact 3 with the metal base 1 by using the manufacturing equipment 10 is described with reference to FIGS. 5 to 7.

FIG. 6 shows a relationship between elapsed time (horizontal axis) and pressure (vertical axis) when the rotational tool 22 is pressed into the surface of the metal base 1, which is not in contact with the contact 3, while being rotated.

Figure 7A:
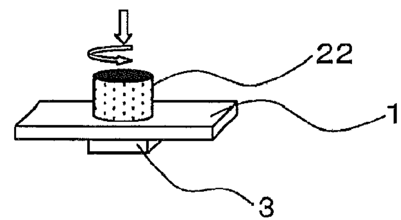

That is, the rotational tool 22 is advanced to the metal base 1 while being rotated, and when the rotational tool 22 comes in contact with the metal base 1 as shown in FIG. 7A, pressure begins to increase. However, a slight gap may be formed between the metal base 1 and the contact 3, for example, in the case that the metal base 1 is slightly bent due to fluctuation in finished size or the like. In this case, pressure applied from the rotational tool 22 gradually increases as shown by a sign a in FIG. 6.

When the metal base 1 becomes in tight contact with the contact 3, pressure applied from the rotational tool 22 abruptly increases. At that time, frictional heat is abruptly generated in a region where the rotational tool 22 contacts to the metal base 1. Such a point at which pressure abruptly increases is assumed as an adhesion start point P1 shown in FIG. 6.

That is, when a gap exists between the metal base 1 and the contact 3, true pressing depth of the rotational tool 22 is not clearly known. However, the position at which pressure abruptly increases is defined as the adhesion start point P1 as described above, and thereby the true pressing depth of the rotational tool 22 can be confirmed.

When the rotational tool 22 is further pressed, pressure still abruptly increases. Along with that, a region of the metal base 1, which is in contact with the rotational tool 22, is heated by frictional heat, and the region is pressed and rotated by the rotational tool 22, and thereby plastic flow S begins to occur (refer to FIG. 7B). After the pressure reaches a peak P2 (FIG. 6), it suddenly decreases as shown by a sign b in FIG. 6. Such change in pressure occurs due to a phenomenon that the plastic flow S becomes thicker, and thereby the metal base 1 is softened as shown in FIG. 7B.

In this configuration, when the rotational tool 22 is further pressed, pressure gradually decreases, and when the rotational tool 22 is pressed to a predetermined depth position, the rotational tool 22 stops its movement in a vertical direction at the pressing depth position, while maintaining its rotational movement. When pressing of the rotational tool 22 stops in this way, pressure further decreases from a position P3 corresponding to the decreased pressure as shown by a sign c in FIG. 6.

Then, the rotational tool 22 is held for a certain time at a predetermined pressing depth position, and thereby pressure is approximately constant as shown by a sign d in FIG. 6.

Figure 7B:
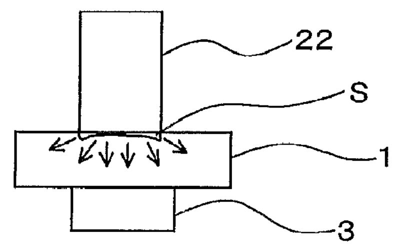
Figure 7C:
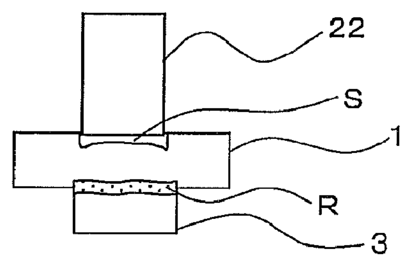

In this way, the rotational tool 22 is pressed into the metal base 1 while rotating at a predetermined speed, thereby frictional heat generated between the rotational tool 22 and the metal base 1 is transferred even to the contact surfaces of the metal base 1 and the contact 3 as shown by arrows in FIG. 7B. Thus, high temperature heat and pressure are applied to the contact surfaces of the metal base 1 and the contact 3, and solid state diffusion welding is performed between the joining surfaces of the metal base 1 and the contact 3 as shown in FIG. 7C, so that a solid state diffusion welding region R is formed, and the metal base 1 and the contact 3 are joined to each other via the solid state diffusion welding region R. The solid state diffusion welding is a type of diffusion welding, which uses diffusion of atoms for bonding, and refers to a joining method in a solid phase without melting joining surfaces.

In the manufacturing equipment 10, the pressure detection unit 25 detects a waveform showing change in pressure of the rotational tool 22 with elapsed time when the rotational tool 22 is pressed into the metal base 1 at a predetermined speed (refer to FIG. 6), and the control unit 35 controls the advancement and retraction of the rotational tool 22 based on the signal from the pressure detection unit 25, so that the metal base 1 and the contact 3 can be joined together by solid state diffusion welding.

To achieve the solid state diffusion welding between the metal base 1 and the contact 3, the control unit of the manufacturing equipment 10 is designed such that when the rotational tool 22 is pressed into the metal base 1 at a predetermined speed while being rotated, the control unit determines a position at which pressure detected by the pressure detection unit 25 exceeds a predetermined value as the adhesion start point P1, and drives the rotational tool based on positional information from the position calculating unit 29 such that the rotational tool 22 is pressed from the adhesion start point P1 to the predetermined depth position, then the tool is held at the depth position for a certain time, and then raised (refer to FIG. 2).

Therefore, the control unit 35 has a not-shown storage device, which is beforehand inputted with conditions such as a pressure to be a reference for detecting the adhesion start point P1, a depth by which the rotational tool 22 is pressed from the adhesion start point P1, and a period for which the rotational tool 22 is held at a position of the depth, and stores the conditions.

An example of control operation of the control unit 35 is described with reference to a flowchart shown in FIG. 5. However, control operation of the control unit 35 is not limited to operation shown by the flowchart.

That is, when the rotational tool 22 is lowered and contacts to the metal base 1, and the pressure detection unit 25 detects increase in pressure, the control unit 35 begins to compare the increased pressure with the predetermined pressure beforehand stored in the control unit 35 in step S1, and when pressure of the rotational tool 22 exceeds the predetermined value, the control unit determines a position of the rotational tool 22 at that time as the adhesion start point P1.

During this, the position calculating unit 29 sends the positional information on the rotational tool 22 to the control unit 35, and the rotational tool is further lowered from the position at which the pressure exceeds the adhesion start point P1. Then, in step S2, when a pressing depth of the rotational tool 22 is determined to be large compared with the predetermined depth stored in the control unit 35 based on the positional information on the rotational tool 22, operation is advanced to step S3, and lowering of the rotational tool 22 is stopped.

Then, when pressure of the rotational tool 22 is determined to be constant in step S4, operation is advanced to step 5. In the step S5, when time elapsed from a point when pressure is determined to be flattened, exceeds a certain time beforehand stored in the control unit 35, the rotational tool 22 is raised and returns to an initial position in step S6.

Next, description is made on a manufacturing method of the electric contact of the invention using the manufacturing equipment 10 including the above configuration.

As shown in FIG. 7A, the rotational tool 22 is pressed into the metal base 1 at a predetermined speed while being rotated. The metal base 1 is supported by and superimposed on the contact 3.

Thus, pressure of the rotational tool 22 abruptly increases, and the rotational tool 22 is pressed to a predetermined depth position from the start point P1 of adhesion between the contact 3 and the metal base 1, at which the pressure exceeds the predetermined value. The rotational tool 22 is held at the depth position for a certain time. During such a pressing step, frictional heat is transferred to the joining surfaces of the metal base 1 and the contact 3 as shown in FIG. 7B. Thus, solid state diffusion welding is performed between the joining surfaces of the metal base 1 and the contact 3 as shown in FIG. 7C, so that a solid state diffusion welding region R is formed, and the metal base 1 is joined to the contact 3 via the solid state diffusion welding region R.

When the solid state diffusion welding is performed between the joining surfaces of the metal base 1 and the contact 3 in this way, the rotational tool 2 is raised and returned to an original position, and the joining process between the metal base 1 and the contact 3 is finished.

In this way, joining between the metal base 1 and the contact 3 according to the invention does not use so-called friction stir welding where plastic flow S is formed to range over both members to be joined so as to join the members via the plastic flow S, and uses solid state diffusion welding to join the metal base 1 and the contact 3 to each other. Thus, time required for joining the metal base 1 with the contact 3 can be reduced, leading to improvement in productivity. Moreover, since pressing depth of the rotational tool 22 can be decreased to the minimum necessary depth, dimension stability can be improved, and a dent, an impression, contact marks, discoloration and the like can be suppressed to appear on the contact 3. Furthermore, pressing depth of the rotational tool 22 is controlled, thereby an electric contact having substantially no fluctuation in quality can be stably produced.

In the step S1, pressure of the rotational tool 22 is compared to a predetermined value being beforehand set, and thereby whether the pressure exceeds the predetermined value is determined in order to detect the adhesion start point P1. At that time, as the predetermined value, a value selected from 5 to 20 kg is preferably used. For example, a point when the pressure exceeds 10 kg is assumed as the adhesion start point P1, and the control unit 35 using NC control or the like controls the rotational tool 22 so as to be pressed from the point to a certain pressing depth position, and thereby the certain pressing depth can be constantly kept without any fluctuation.

The pressing depth of the rotational tool 22 from the adhesion start point P1 is preferably 1/20 or more of thickness of the metal base 1, and more preferably 1/20 to 1/5 thereof. For example, in the case that thickness of the metal base 1 is 2 mm, the pressing depth is most preferably about 0.2 mm. The pressing depth is set in this way, and thereby the metal base 1 and the contact 3 can be securely joined by solid state diffusion welding with adequate joining strength. When the pressing depth is smaller than 1/20 of thickness of the metal base 1, an uneven pressing (uneven contact) condition may slightly occur between the metal base 1 and the contact 3, resulting in inadequate joining strength. When the pressing depth exceeds 1/5 of thickness of the metal base 1, impression and the like may conspicuously appear, which is not preferable in the light of quality and accuracy of products, and causes reduction in workability.

In the embodiment, when the rotational tool 22 is pressed into the metal base 1, the rotational tool 22 is pressed to a lowering position after pressure of the tool reaches the peak P2. However, such pressing depth is not limitative in the invention, and when the solid state diffusion welding is performed between the contact surfaces of the metal base 1 and the contact 3 at a depth position before pressure of the tool reaches the peak P2, the tool may be pressed to the depth position. However, the pressing depth of the rotational tool 22 is set to be at least the depth at which the pressure reaches the peak P2 as shown in FIG. 6, and thereby thermal energy required for solid state diffusion welding between the joining surfaces of the metal base 1 and the contact 3 can be adequately generated.

Furthermore, in the embodiment, as shown in a pressure waveform of FIG. 6, the rotational tool 22 that has been pressed to a predetermined depth position is stopped at the position and held for a certain time. However, such holding time is not always needed, and the rotational tool 22 may be immediately raised after it has been pressed to the predetermined depth position. However, as described before, after pressing of the rotational tool 22 is stopped, and pressure is flattened, the rotational tool 22 is held for a certain time, and thereby thermal energy required for solid state diffusion welding between the joining surfaces of the metal base 1 and the contact 3 can be securely transferred, and consequently weldability between the metal base 1 and the contact 3 can be stabilized.

In the case of the embodiment, for example, the rotational tool 22 can be controlled such that pressure of the rotational tool 22 in a condition shown by the sign c in FIG. 6 is set to be, for example, 65 kg, and if a certain pressure is kept for a period of, for example, 0.5 sec or more after the pressure has been decreased to less than 65 kg, the pressure is considered to be constant, and the rotational tool 22 is held for a certain time from the end of the period.

When the rotational tool 22 comes in contact with the metal base 1, and pressure begins to be exerted, frictional force is increased. Therefore, when rotational speed is kept to be constant, motor torque must to be changed. Thus, it is acceptable that change in motor torque is detected by the motor torque detection unit 33 in place of change in pressure of the rotational tool 22, and a signal from the unit 33 is sent to the control unit 35, so that advancement and retraction of the rotational tool 22 is controlled based on the change in motor torque.

Materials of the metal base 1 and the contact 3 used in the manufacturing method are not particularly limited. However, a metal material is preferably used, which is feasible for solid state diffusion welding between contact surfaces of both. For example, Cu or Cu-based alloy is preferably used for the metal base 1.

At least a contact surface, to come in contact with the contact 3, of the metal base 1 may be subjected to plating including metal feasible for mutual solid state diffusion with the contact 3. As such plating, for example, Sn plating, Ag plating, Au plating, Pb-free plating (Sn—Ag-based material and the like), and Zn plating are given. Such plating is applied, thereby when the metal base 1 is heated by frictional heat caused by the rotational tool 22, a plating layer on the metal base 1 exhibits solid state diffusion so that the metal base 1 can be more easily joined with the contact 3. That is, pressing depth of the rotational tool 22 can be reduced, and holding time after pressing the rotational tool 22 can be reduced, consequently productivity can be improved. For example, when thickness of the metal base 1 is 1.2 mm, the pressing depth can be at least about 0.07 mm, and even if such a degree of pressing depth is given, shear strength of 120 $N/mm^2$ or more can be obtained.

On the other hand, as a material of the contact 3, Cd-free Ag alloy or Cd alloy as shown in the following Table 1 can be used.

TABLE 1

| | Ag-based | Ag-oxide-based | W-based | Cd-based |
|---|---|---|---|---|
| Contact material | Ag<br>Ag—Cu<br>Ag—Cu—Ni<br>Ag—Ni | Ag—ZnO<br>Ag—SnO<br>Ag—SnO—InO | W<br>Ag—W<br>Cu—W | Ag—Cd<br>Ag—CdO |

The contact 3 including such a material can be directly joined to the metal base 1 by using the manufacturing method of the invention. However, in the case of an oxide contact, fluctuation in joining strength tends to occur. Therefore, an oxide contact is preferably used, which is beforehand cladded with a metal layer to be easily joined, or beforehand subjected to plating having an appropriate thickness.

In the invention, while not particularly limited, preferably, diameter D of the rotational tool 22 (refer to FIGS. 8A to 8B) is 3 to 9 mm, the number of rotations of the rotational tool 22 is 3000 to 10000 rpm, and thickness of the metal base 1 is 1 to 2.5 mm. According to this, since frictional heat caused by the rotational tool 22 is effectively transferred to the contact surfaces of the metal base 1 and the contact 3, solid state diffusion welding can be easily performed.

To describe specific meaning of each of the conditions, it is known that energy Q generated from the rotational tool 22 and applied to a material to be joined is generally given by the following expression (a).

[Math. 1]

$$Q(J)=(4/3)*\pi^2*D^3*P*N*\mu \quad (a)$$

Here, D shows end diameter (m) of the rotational tool 22, P shows pressure ($N/m^2$) of the rotational tool 22, N shows the number of rotations (rad/s) of the rotational tool 22, and μ shows frictional coefficient.

As seen from the expression (a), the energy Q is greatly influenced by the cube of the tool diameter D of the rotational tool 22. Therefore, as the end diameter D of the rotational tool 22 becomes larger, the energy Q becomes larger, and consequently the contact 3 is more easily joined to the metal base 1. Conversely, as the end diameter D of the rotational tool 22 becomes smaller, since the energy Q is abruptly reduced, it becomes more difficult to join the contact 3 together with the metal base 1.

In the embodiment, the diameter D of the rotational tool 22 is 3 to 9 mm, that is, considerably small compared with tool diameter of about 16 mm used for typical friction stir welding, and therefore the energy Q is also small. However, in the manufacturing method, the metal base 1 is joined to the contact 3 by solid state diffusion welding rather than by joining using plastic flow S as described before. Therefore, high energy Q for forming plastic flow S deep enough to reach each joining surface is not necessary, and therefore the above conditions are used, so that the metal base 1 can be adequately joined to the contact 3.

Figure 8A:
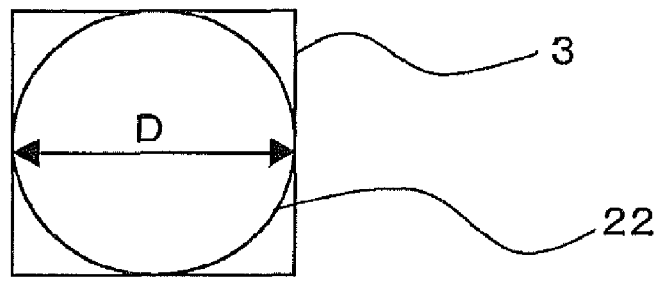
Figure 8B:
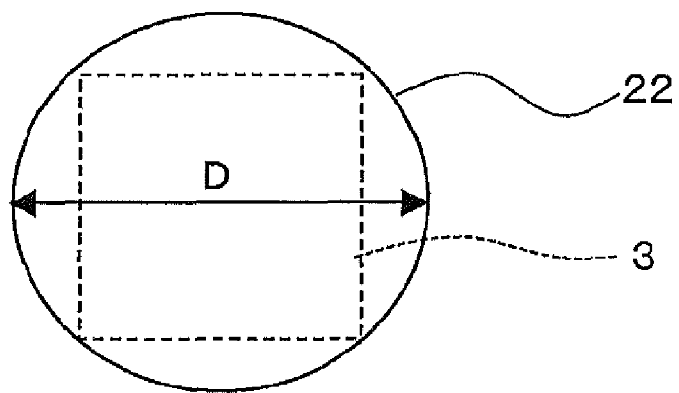

FIG. 8 shows a specific example of an end face shape of the rotational tool 22 and a shape of the contact 3. That is, in an example shown in FIG. 8A, the diameter D of the rotational tool 22 is sized to be inscribed in the contact 3. Therefore, frictional heat caused by the rotational tool 22 is efficiently transferred to the contact 3. In an example shown in FIG. 8B, the diameter D of the rotational tool 22 is sized to be circumscribed with the contact 3. In this case, since the whole joining surface of the contact 3 is covered by the end face of the rotational tool 22, frictional heat caused by the rotational tool 22 can be securely transferred to the whole joining surface of the contact 3.

Figure 9A:
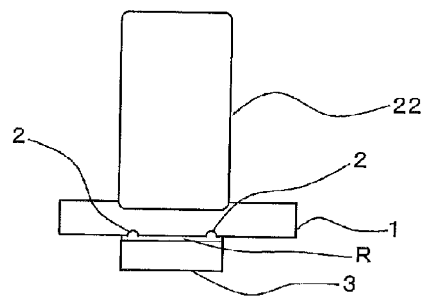

In the manufacturing method, a groove having a predetermined depth is preferably provided on a surface, which is to be contacted with the contact 3, of the metal base 1. This is described with reference to FIGS. 9A to 9D. That is, as shown in FIG. 9A, a groove 2 having a predetermined depth is formed on a surface of the metal base 1, which is to come in contact with the contact 3. Thus, during solid state diffusion welding between the metal base 1 and the contact 3, a contact surface of the contact 3 is plastically deformed, so that part of the solid state diffusion welding region R enters the groove 2 of the metal base 1 and joins to the metal base 1. Therefore, an anchor effect acts to resist force in a shear direction, so that shear strength can be improved.

Figure 9B:
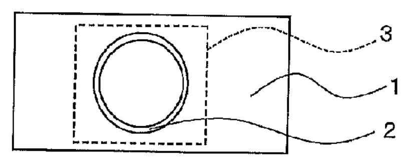
Figure 9C:
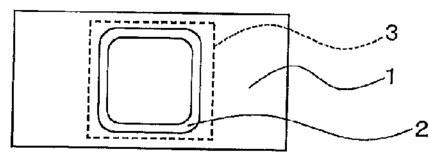

The groove 2 may be in a shape of a circle as shown in FIG. 9B, a square as shown in FIG. 9C, a straight line, two straight lines, or intersected lines like a cross, that is, may be in any shape if the groove can provide the anchor effect. The groove 2 may be formed by a dent caused by pressing, or may be formed by scribing using a pointed scribing pin or the like. Depth of the groove 2 may be extremely shallow, for example, 0.1 mm or less.

Figure 9D:
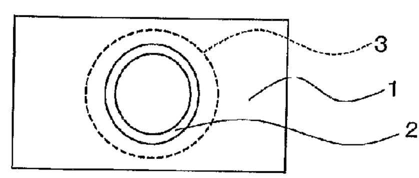

Furthermore, FIG. 9D shows a case that the contact 3 is in a circular shape. In this case, preferably, the groove 2 is also in a circular shape. In the case of a circular contact 3 in this way, since the contact 3 has a similar shape with an end of the rotational tool 22 being also in a circular shape, the joining surface of the contact 3 can be efficiently covered by the end of the rotational tool 22 compared with a contact 3 having a square shape. Moreover, the diameter D of the rotational tool 22 can be easily set, and when joining is performed, the center of the rotational tool 22 can be easily aligned with the center of the contact 3, and therefore positioning is facilitated, and furthermore uniformity in a joint is easily secured.

The invention claimed is:

1. A manufacturing method of an electric contact, comprising:

superimposing a contact and a metal base on a jig, such that the contact and the metal base are supported by the jig, the metal base being disposed on the contact, the metal base having a first surface facing the contact and a second surface opposite to the first surface;

pressing a rotational tool into the second surface of the metal base to come in contact with the second surface while the rotational tool rotates at a predetermined speed, wherein the rotational tool presses the second surface of the metal base in a region corresponding to the contact, and advances in a direction toward the jig, and generating frictional heat by friction between the rotational tool and the second surface in contact with the rotational tool wherein the generated frictional heat is then transferred to the first surface;

joining together the contact and the first surface that is not in contact with the rotational tool, by solid state diffusion welding by using the transferred frictional heat; and then retracting the rotational tool from the metal base.

2. The manufacturing method of an electric contact according to claim 1, wherein, during the pressing step, pressure of the rotational tool or motor torque for rotating the rotational tool is detected, and a pressing position at which the pressure or the motor torque exceeds a predetermined value is assumed as an adhesion start point, and then the rotational tool is further pressed from the adhesion start point to a predetermined depth position.

3. The manufacturing method of an electric contact according to claim 2, wherein, after the rotational tool is further pressed from the adhesion start point to the predetermined depth position, the rotational tool is held at the predetermined depth position for a certain time, and then retracted from the metal base.

4. The manufacturing method of an electric contact according to claim 2, wherein the rotational tool is further pressed from the adhesion start point by 1/20 or more of thickness of the metal base to reach the predetermined depth position.

5. The manufacturing method of an electric contact according to claim 1, wherein a groove having a predetermined depth is provided on the first surface of the metal base.

6. The manufacturing method of an electric contact according to claim 1, wherein at least the first surface of the metal base is subjected to plating including metal feasible for mutual solid state diffusion with the contact.

7. The manufacturing method of an electric contact according to claim 1, wherein a diameter of the rotational tool is 3 to 9 mm, and a rotational speed of the rotational tool is 3000 to 10000 rpm, and a thickness of the metal base is 1 to 2.5 mm.

8. Manufacturing equipment of an electric contact, comprising:

a jig for superimposing and supporting a contact and a metal base, the metal base having a first surface facing the contact and a second surface opposite to the first surface;

a rotational tool that rotates at a predetermined speed, and advances to the jig so as to be pressed into the second surface of the metal base in a region corresponding to the contact;

a detection unit for detecting pressure of the rotational tool, or motor torque of the rotational tool; and a control unit that controls raising/lowering of the rotational tool based on a signal from the detection unit, wherein:

when the rotational tool is pressed into the metal base to come in contact with the second surface of the metal base while being rotated, the control unit determines a position, at which the pressure or the motor torque detected by the detection unit exceeds a predetermined value, as an adhesion start point, and drives the rotational tool so as to be further pressed to a predetermined depth position from the adhesion start point, and then to be retracted from the metal base; and the rotational tool generates frictional heat by friction between the rotational tool and the second surface in contact with the rotational tool and the generated frictional heat is then transferred to the first surface, so that the contact and the first surface that is not in contact with the rotational tool are joined together by solid state diffusion welding by using the transferred frictional heat.

9. The manufacturing equipment of an electric contact according to claim 8, wherein:

the control unit drives the rotational tool so as to be further pressed from the adhesion start point to the predetermined depth position, and to be held at the predetermined depth position for a certain time, and then to be retracted from the metal base.

10. The manufacturing equipment of an electric contact according to claim 9, wherein:

the jig is formed of ceramics or stainless steel.

11. The manufacturing method of an electric contact according to claim 3, wherein the rotational tool is further pressed from the adhesion start point by 1/20 or more of thickness of the metal base to reach the predetermined depth position.

12. The manufacturing method of an electric contact according to claim 2, wherein a groove having a predetermined depth is provided on the first surface of the metal base.

13. The manufacturing method of an electric contact according to claim 3, wherein a groove having a predetermined depth is provided on the first surface of the metal base.

14. The manufacturing method of an electric contact according to claim 4, wherein a groove having a predetermined depth is provided on the first surface of the metal base.

15. The manufacturing method of an electric contact according to claim 2, wherein at least the first surface of the metal base is subjected to plating including metal feasible for mutual solid state diffusion with the contact.

16. The manufacturing method of an electric contact according to claim 3, wherein at least the first surface of the metal base is subjected to plating including metal feasible for mutual solid state diffusion with the contact.

17. The manufacturing method of an electric contact according to claim 4, wherein at least the first surface of the metal base is subjected to plating including metal feasible for mutual solid state diffusion with the contact.

18. The manufacturing method of an electric contact according to claim 5, wherein at least the first surface of the metal base is subjected to plating including metal feasible for mutual solid state diffusion with the contact.

19. The manufacturing method of an electric contact according to claim 2, wherein a diameter of the rotational tool is 3 to 9 mm, and a rotational speed of the rotational tool is 3000 to 10000 rpm, and a thickness of the metal base is 1 to 2.5 mm.

20. The manufacturing method of an electric contact according to claim 3, wherein a diameter of the rotational tool is 3 to 9 mm, and a rotational speed of the rotational tool is 3000 to 10000 rpm, and a thickness of the metal base is 1 to 2.5 mM.

* * * * *